J. AMAN.
BEAN OR WEED CUTTER.
APPLICATION FILED MAY 20, 1919.

1,337,499.

Patented Apr. 20, 1920.

Inventor
Jacob Aman
By Moulton & Furnance
Attorneys

UNITED STATES PATENT OFFICE.

JACOB AMAN, OF TALMADGE TOWNSHIP, OTTAWA COUNTY, MICHIGAN.

BEAN OR WEED CUTTER.

1,337,499. Specification of Letters Patent. Patented Apr. 20, 1920.

Application filed May 20, 1919. Serial No. 298,539.

*To all whom it may concern:*

Be it known that I, JACOB AMAN, a citizen of the United States of America, residing in the township of Talmadge, in the county of Ottawa and State of Michigan, have invented certain new and useful Improvements in Bean or Weed Cutters; and I do hereby declare the following to be a full, clear, and exact description of the invention, such as will enable others skilled in the art to which it appertains to make and use the same.

Figure 1:
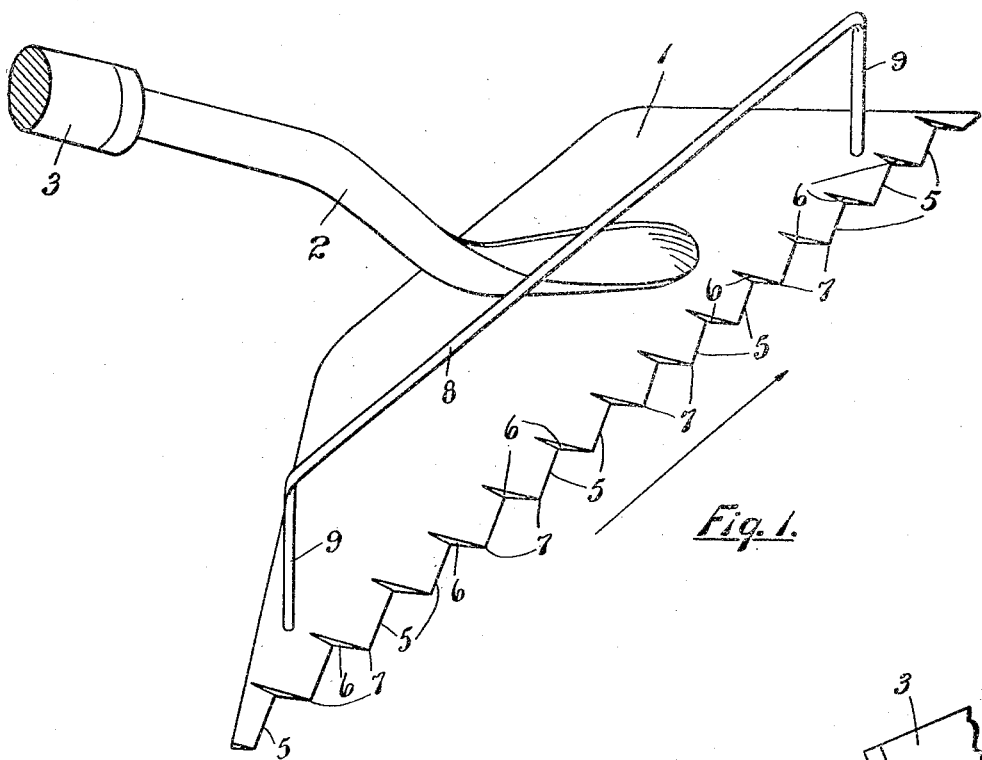
Figure 2:
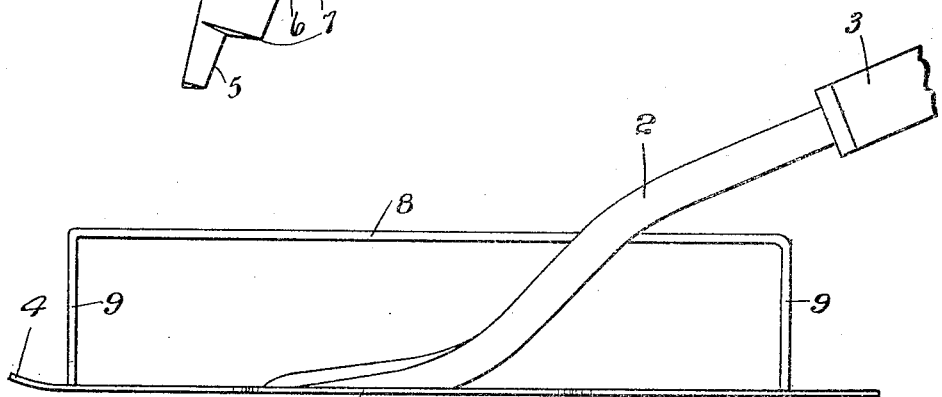

This invention relates to a bean or weed cutter, being particularly concerned with the production of a very simple and economically manufactured device of this character which may be used to great advantage in severing beans, weeds or similar plants just above the ground, the device being one that can be used to cut beans in harvesting the same with great rapidity. It is an object and purpose of the invention to construct this device in such a manner that a plurality of cutting edges may be had, so situated with respect to the line of movement of the device in use that they are guarded against coming in contact with small stones or the like which would soon dull the cutting edges that cutting beans or other plants would be practically impossible in a short time. A further object of the invention is to produce a cutting blade having a plurality of cutting edges located at one edge thereof in succession one after the other that a failure to sever the stems of beans or weeds and the like with the first cutting edge against which they come is remedied by those coming against the stems afterward. A still further object of the invention is to supply the cutting blade with a guard or the like which as the blade is passed along a row or hill of beans enters under the tops thereof and lifts the same so that the cutting edges of the blade may come properly against the stems to sever the same. All of these objects and purposes, together with many others not stated in detail at this point will appear fully as the description progresses, of the device shown in the accompanying drawings, in which, Figure 1 is a perspective view of the cutter, and Fig. 2 is a rear view thereof.

Like reference characters refer to like parts in the different views of the drawing.

In construction, a flat piece of steel 1 is used somewhat elongated in shape to which a rod 2 is fixed at its lower end to the upper side of the plate in any suitable manner. This rod extends upwardly, rearwardly and to one side at an angle and has a handle 3 connected thereto which may be of any convenient length such that one using the cutter may move the flat metal piece 1 over the ground in the direction of its length, as indicated by the arrow. In practice the part 1 has its front end, at least, turned upwardly as indicated at 4 so that there is no tendency for said end to try to dig into the ground during this operation.

At the edge of the plate or blade 1 away from which the rod 2 and handle 3 extend, a plurality of cutting edges 5 placed one after the other, are formed, the same lying at an angle to the length of the blade as shown and each being located behind a protecting shoulder 6 of triangular form, said shoulders and the cutting edges 5 in front of them coming to points 7 whereby there is in effect, made a serrated cutting side to the blade combining a consecutive series of guarded cutting edges, each protected by a guarding shoulder 6. Stones and the like strike against the points 7 and may dull the same, but the cutting edges in front of such points are not affected. In practice, it may be desirable to round off or blunt the points 7, though in use such points soon become blunted.

This cutter when run alongside of a row or hill of beans severs the stems thereof just above the ground, the stems coming in behind the shoulders 6 and against the cutting edges 5 one after the other until completely severed. The stems may be severed by the first cutting edge against which they come, but if not, the severing is soon completed. This works with weeds quite as well. In practice the sharpening of the cutting edges is readily accomplished by a file held in substantial alinement with the handle 3 or parallel thereto, but this sharpening is not needed frequently, for the reasons stated.

It is desirable to provide a guard which passes under the bean vines lifting the same partly and leaving a clear space so that the cutting edges may be brought against the stems without interference from the upper parts of the vines. Accordingly, a wire 8 is provided having its ends bent to make end pieces 9 which are attached in any suitable manner to the plate 1, this positioning the wire 8 a distance above the plate and back of the cutting edges so that when the plate is run on the ground alongside of a row or hill of beans, the wire 8 passes under the upper portion of the vines lifting the same and clearing the way for the cutting edges to be brought against the stems of the beans. This is very desirable as bean vines, especially where the growth is large bend over and lie on the ground, and the wire 8 serves to raise them from the ground and make the stems of the vines free of access for the operation of the cutting edges of the device.

From the foregoing it is apparent that I have provided a very efficient and practical device for cutting beans or like plants having stems of relatively small size. While I have disclosed a single cutting blade, it is apparent that two of the blades may be attached to any suitable horse drawn appliance so that two rows of beans may be cut at the same time, it being a mere duplication of the cutter and with the cutters located so as to cut two rows. The location of the cutting edges back of protecting shoulders is the feature of greatest value in the device, as from this a protection of the cutting edges is secured which makes the device practically operative, where otherwise, the rapid dulling of the cutting edges would require a sharpening of the same so frequently that practical use of the device would be impossible.

I claim:

1. In a device of the character described, an elongated cutter blade formed at one longitudinal edge with a consecutive series of cutting edges located at an acute angle to the length of the blade, each of said cutting edges being located behind a protecting shoulder projecting from the blade in front of said edge whereby the edges are protected from contact with stones or like articles, substantially as and for the purposes described.

2. In a device of the character described, an elongated cutter blade formed at one longitudinal edge with a consecutive series of cutting edges located at an acute angle to the length of the blade and extending outwardly from its front to its rear end, said blade also having a consecutive series of shoulders at the front ends of said cutting edges each of which lies in front of one cutting edge and back of the preceding cutting edge, and means attached to the blade for moving it along the ground in the direction of its length, said shoulders serving as guards to protect the cutting edges lying back of the shoulders from contact with stones or the like as it is moved over the ground, substantially as and for the purposes described.

3. In a device of the character described, an elongated cutter blade formed at one longitudinal edge with a consecutive series of cutting edges, each located at an angle to the length of the blade, each of said cutting edges being located behind a protecting shoulder whereby the cutting edges are protected from contact with stones or the like as the blade is moved along the ground in the direction of the length of the blade, and a member disposed lengthwise of and above the blade a distance back of said cutting edges and permanently secured to the blade, substantially as and for the purposes described.

4. In a device of the character described, an elongated cutter blade having its forward end turned upwardly and having one longitudinal edge formed with a consecutive series of cutting edges located at an angle to the length of the blade, the front portion of each cutting edge being located directly back of a protecting shoulder formed on the blade, said cutting edges extending rearwardly and outwardly from their front portions to the rear, whereby the cutting edges are protected from contact with stones or like articles as the blade is moved over the ground in the direction of its length, and means connected to the blade for moving it over the ground in the direction of its length, substantially as described.

In testimony whereof I affix my signature.

JACOB AMAN.